(12) United States Patent
Huber

(10) Patent No.: US 6,310,446 B1
(45) Date of Patent: Oct. 30, 2001

(54) METHOD FOR ADJUSTING AT LEAST ONE OPERATING PARAMETER OF AN OPERATING UNIT FOR ELECTRIC LAMPS

(75) Inventor: Andreas Huber, Treunreut (DE)

(73) Assignee: Patent Treuhand-Gesellschaft fuer elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/542,334

(22) Filed: Apr. 5, 2000

(30) Foreign Application Priority Data

Apr. 16, 1999 (DE) .............................................. 199 17 365

(51) Int. Cl.$^7$ ..................................................... G05F 1/00
(52) U.S. Cl. ......................... 315/307; 315/291; 315/310; 315/311
(58) Field of Search ..................................... 315/307, 308, 315/291, 224, 292, 293, 310, 311

(56) References Cited

U.S. PATENT DOCUMENTS

| 5,039,921 | * | 8/1991 | Kakitani ................. | 315/307 |
| 5,680,015 | * | 10/1997 | Bernitz et al. ........... | 315/291 |
| 5,914,572 | * | 6/1999 | Qian et al. .............. | 315/307 |
| 6,040,661 | * | 3/2000 | Bogdan ................. | 315/224 |
| 6,081,077 | * | 6/2000 | Canova et al. ........... | 315/307 |
| 6,160,361 | * | 12/2000 | Giannopoulos et al. ...... | 315/307 |

* cited by examiner

Primary Examiner—Don Wong
Assistant Examiner—Tuyet T. Vo
(74) Attorney, Agent, or Firm—Carlo S. Bessone

(57) ABSTRACT

The invention relates to a method for adjusting at least one operating parameter of an operating unit (EVG), equipped with a microcontroller (MC), for electric lamps. The adjusting method according to the invention includes a closed loop which carries out a successive correction of at least one drive parameter, stored in the microcontroller (MC), for the voltage transformer of the operating unit (EVG). There is no need for an adjusting resistor.

10 Claims, 3 Drawing Sheets

Figure 1:
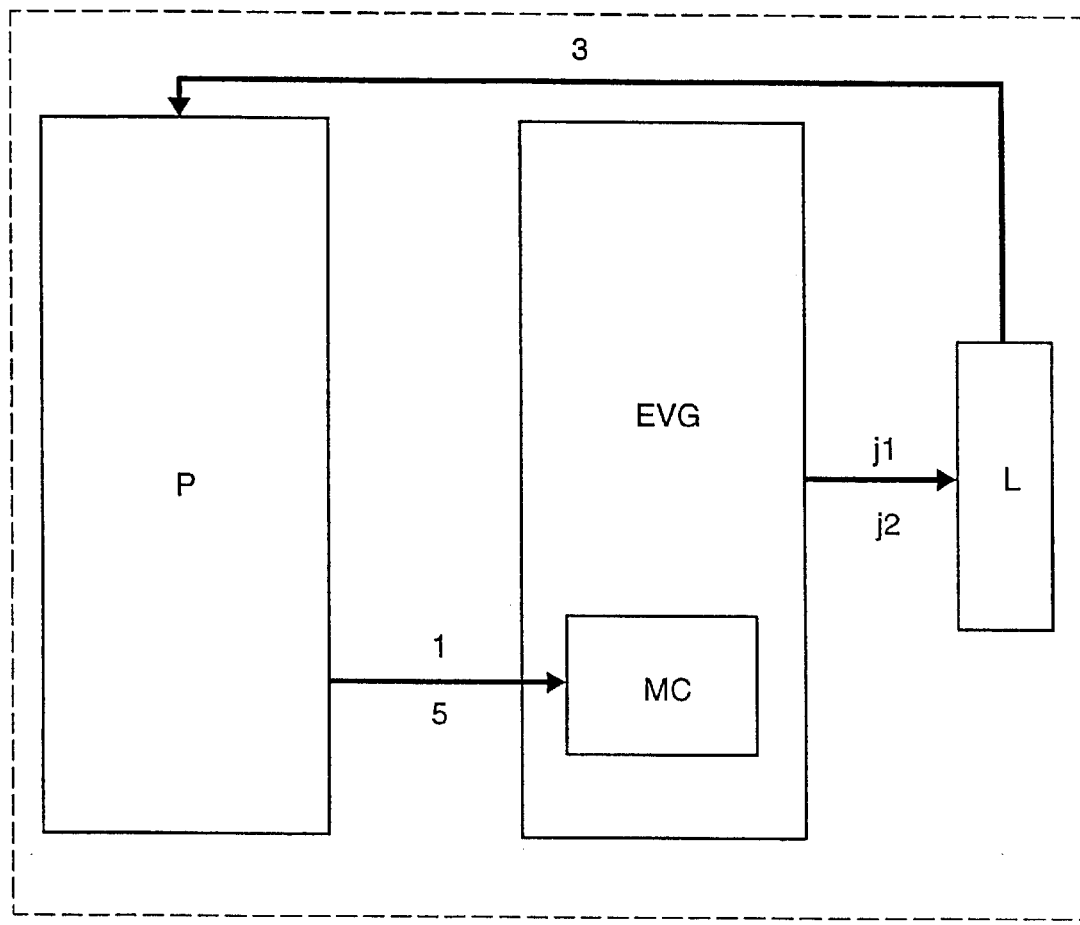

METHOD FOR ADJUSTING AT LEAST ONE OPERATING PARAMETER OF AN OPERATING UNIT FOR ELECTRIC LAMPS

The invention relates to a method for adjusting at least one operating parameter of an operating unit for electric lamps in accordance with the preamble of patent claim 1.

TECHNICAL FIELD

It is a well known fact that, because of the tolerances of the individual components, identically produced operating units for electric lamps can have different operating parameters, in particular different output voltages or output powers. It therefore has to be ensured when producing operating units for electric lamps that the lamps to be connected to the operating unit are also actually operated with their nominal data. For this purpose, an adjusting method is carried out in which one or more operating parameters of the operating units are adjusted such that the lamps connected to the operating units can be operated with their nominal data.

For example, a suitably dimensioned resistor is soldered into the operating unit for the purpose of adjusting the operating unit. The value of this adjusting resistor is determined individually for each operating unit during the adjusting method. This adjusting resistor ensures that the lamps connected to the operating unit are operated with their nominal data. Another possibility consists in installing in the operating unit a potentiometer which is set to the suitable value during the adjusting method.

SUMMARY OF THE INVENTION

It is the object of the invention to provide an improved method for adjusting at least one operating parameter of an operating unit for electric lamps, in the case of which there is no need for an adjusting resistor tuned to the respective operating unit.

This object is achieved according to the invention by means of the characterizing features of patent claim 1. Particularly advantageous embodiments of the invention are described in the subclaims.

During the adjusting method according to the invention, for the purpose of adjusting at least one operating parameter of the operating unit at least one drive parameter which is stored in the operating unit and determines the driving of the voltage transformer is successively varied in a closed loop, and with each traversal of the closed loop a desired value/actual value comparison of the at least one operating parameter to be adjusted is carried out. The closed loop is not left until the actual value of the at least one operating parameter deviates from its desired value by not more than a prescribed absolute value. For this purpose, the adjusting method has the following method steps according to the invention:

a) operating the operating unit with a calibrated load which is connected into the load circuit and connected to the terminals, b) transmitting at least one control command to the operating unit, which causes the operating unit to set a specific operating state, and which starts the adjusting method for the at least one operating parameter, c) detecting the actual value of the at least one operating parameter, d) comparing the actual value of the at least one operating parameter with a prescribed desired value of the at least one operating parameter, e) determining and storing a correction value or desired value, dependent on the desired value/actual value comparison, for at least one drive parameter, which is stored in the operating unit and determines the driving of the voltage transformer, f) driving the voltage transformer by using the determined correction value or desired value, stored in the operating unit, of the drive parameter, and g) repeating steps c) to f) if the actual value of the at least one operating parameter deviates from its desired value by more than a prescribed absolute value.

The at least one operating parameter of the operating unit which is to be adjusted, is advantageously the output voltage or the output power of the operating unit, since these have a direct influence on the operation of the lamps connected to the operating unit. The adjusting method according to the invention is carried out with the aid of an external process control device which is a component of a production device, in particular a testing device for operating units, and which is advantageously connected during the adjusting method via an external interface of the operating unit to the microcontroller, which is arranged in the operating unit and serves to drive the voltage transformer, in order to generate control commands for the operating unit for the purpose of setting the desired operating state.

DESCRIPTION OF THE PREFERRED EXEMPLARY EMBODIMENTS

Figure 2:
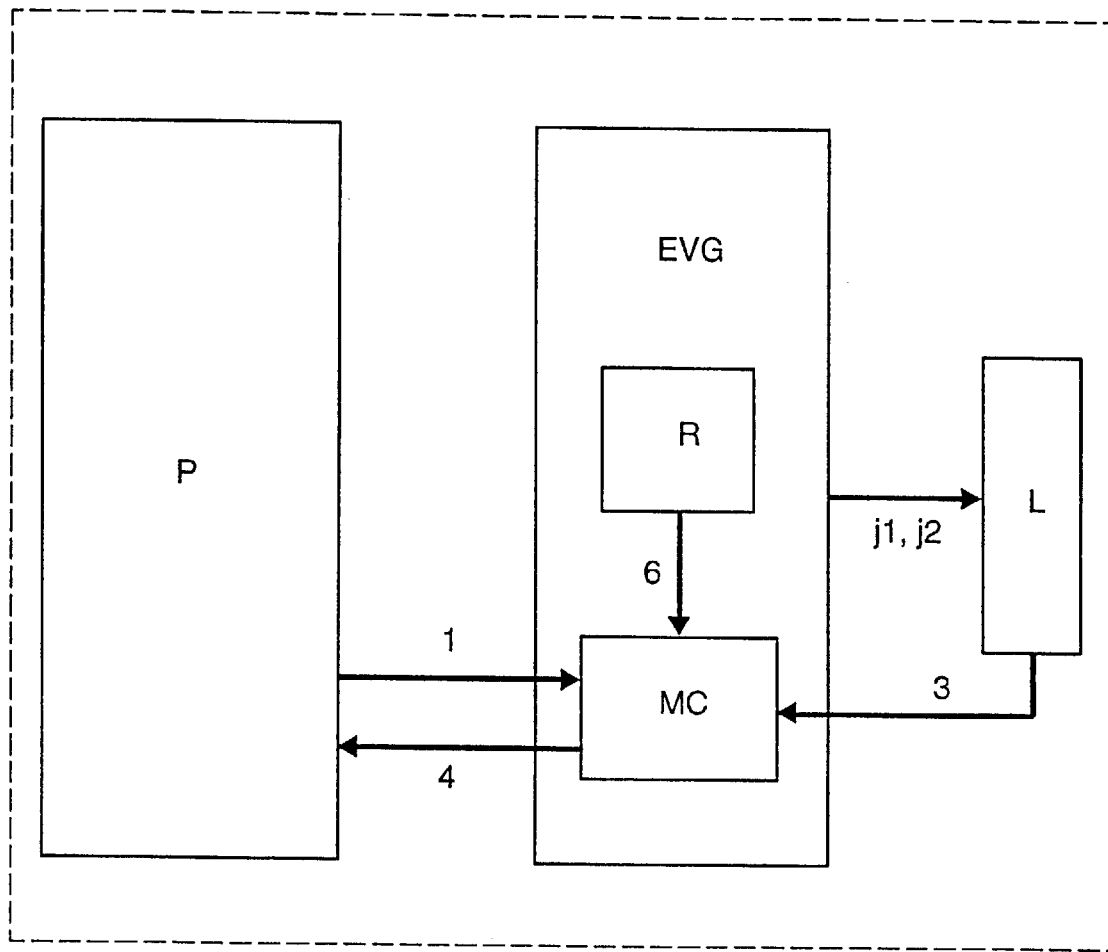
Figure 3:
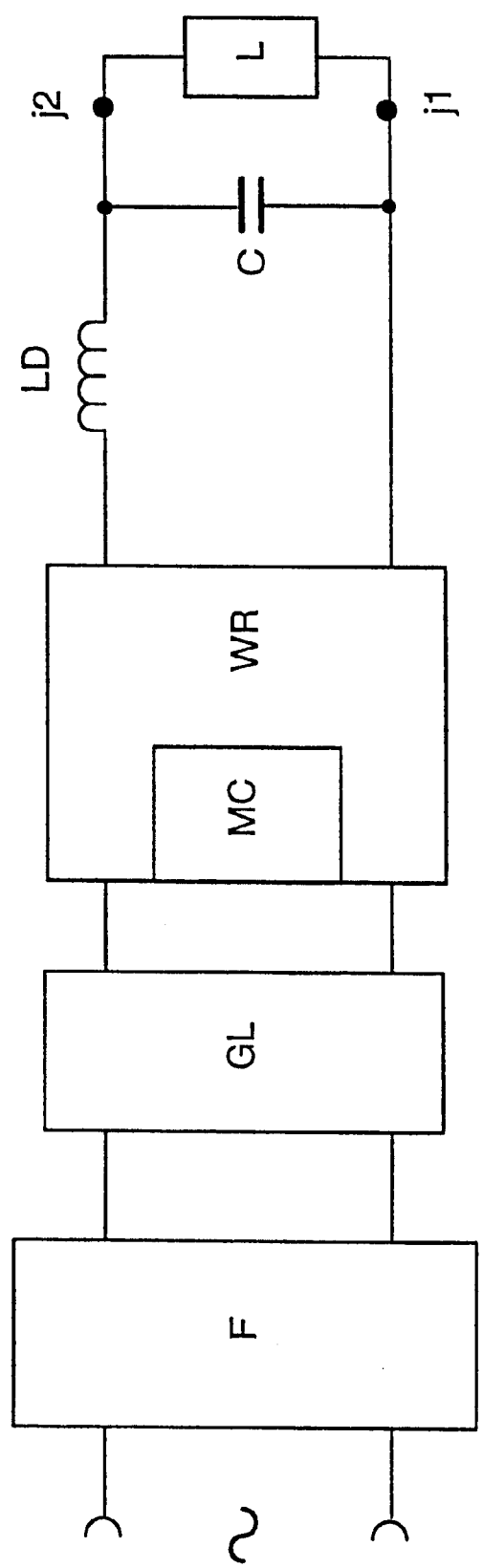

The invention is explained in more detail below with the aid of a plurality of preferred exemplary embodiments. In the drawing:

FIG. 1 shows a schematic representation of the adjusting method in accordance with the first exemplary embodiment of the invention, FIG. 2 shows a schematic representation of the adjusting method in accordance with the second exemplary embodiment of the invention, and FIG. 3 shows a schematic representation of an operating unit for a low-pressure discharge lamp.

The preferred exemplary embodiments of the adjusting method according to the invention are described with the aid of an electronic ballast EVG which serves to operate low-pressure discharge lamps, in particular fluorescent lamps. The design of such an operating unit EVG is illustrated schematically in FIG. 3. It has a line voltage input, a high-frequency filter F, a line voltage rectifier GL, a voltage transformer WR, designed as an inverter, in particular as a half-bridge inverter, a load circuit LD, C, designed as a series resonant circuit and connected downstream of the voltage transformer WR, a microcontroller MC for driving the voltage transformer WR, and terminals j1, j2 for at least one low-pressure discharge lamp. The operating unit EVG further has a serial external interface (not illustrated in FIG. 3) for receiving control commands from a central control device of an illuminating system and/or for transmitting check-back signals to the central control device. During the adjusting method according to the invention, the operating unit EVG is connected via its external interface not to a central control device of an illuminating system, but instead to an external process control device P of a test stand belonging to the production line of the operating unit.

The two exemplary embodiments, described in more detail below, of the adjusting method according to the invention have in common that, at the start of the adjusting method, instead of the low-pressure discharge lamp a calibrated resistor L connected to the terminals j1, j2 of the operating unit EVG is connected into the load circuit LD, C, said resistor representing an equivalent resistor for the low-pressure discharge lamp in the case of a prescribed operating state. With the aid of the external process control device P, which is connected to the microcontroller MC via the external interface of the operating unit EVG, there are applied to the operating unit EVG control commands 1 which cause the operating unit EVG to set the desired operating state and which, at least in the case of the second exemplary embodiment, communicate the start of the adjusting method to the operating unit EVG.

In accordance with the first exemplary embodiment of the adjusting method according to the invention, the actual value 3 of the at least one operating parameter of the operating unit EVG is detected by the external process control device P and compared with a desired value provided by the external process control device P. Depending on the abovementioned desired value/actual value comparison of the at least one operating parameter, the external process control device P uses an implemented computer program to determine a correction value 5 for at least one drive parameter which is stored in the operating unit EVG and determines the driving of the voltage transformer WR. The correction value 5 of the at least one drive parameter is transmitted from the external process control device P to the microcontroller MC via the external, serial interface of the operating unit EVG, and stored in a nonvolatile memory of the operating unit EVG. The microcontroller MC uses the correction value 5 of the at least one drive parameter for the purpose of further, corrected driving of the voltage transformer WR. Via the clock frequency or via the supply voltage of the voltage transformer WR constructed as an inverter, for example, the at least one drive parameter influences the actual value 3, measured at the equivalent resistor L, of the at least one operating parameter of the operating unit. The correction of the at least one drive parameter is performed by means of the computer program, which is implemented in the process control device P, in such a way that the new actual value of the at least one operating parameter has a smaller deviation from its desired value than the previously measured actual value. As long as the desired value/actual value comparison for the at least one operating parameter yields a deviation of the actual value from its desired value by more than a prescribed absolute value, the correction of the drive parameter in accordance with the method steps c), to f), specified above is repeated.

In accordance with the second exemplary embodiment of the adjusting method according to the invention, the desired value/actual value comparison of the at least one operating parameter is carried out with the aid of a program implemented in the microcontroller. The process control device P serves in the case of this exemplary embodiment only to cause the operating unit EVG to set the desired operating state, doing so by transmitting suitable control commands 1, and to communicate the start of the adjusting method to the operating unit EVG. The actual value 3 of the at least one operating parameter is fed to the microcontroller MC. To carry out the desired value/actual value comparison, the microcontroller MC calls the desired value 6 of the at least one operating parameter, which value is stored in the memory R of the operating unit EVG. Depending on the result of the aforementioned desired value/actual value comparison, the program implemented in the microcontroller MC is used to determine a correction value for at least one drive parameter determining the driving of the voltage transformer WR. As already explained above, this drive parameter influences the actual value 3, which is to be measured, of the at least one operating parameter. In a closed loop controlled by the program of the microcontroller MC, the drive parameter is successively varied in accordance with the abovementioned method steps c), to f), until the desired value/actual value comparison of the at least one operating parameter yields a satisfactory correspondence between the desired value 6 and actual value 3. In this case, the microcontroller MC transmits a check-back signal 4 to the external process control device P for the purpose of terminating the adjusting method.

The adjusting method according to the invention can with particular advantage be applied to a dimmable electronic ballast EVG for fluorescent lamps for the purpose of adjusting the output power or the output voltage of the operating unit for the two operating states, which correspond to the highest dimming stage (maximum brightness of the lamp) and the lowest dimming stage (minimum brightness of the lamp) of the operating unit. In order to adjust the output power or output voltage, provided at the terminals j1, j2, for the operating state corresponding to the lowest dimming stage of the lamp, there is connected to the terminals j1, j2 a resistor L which represents an equivalent resistor for the lamp in the state of the lowest dimming stage of the operating unit (minimum brightness of the lamp). The external process control device P transmits to the microcontroller MC via the external serial interface of the operating unit EVG a control signal 1 which causes the operating unit EVG to set the operating state corresponding to the lowest dimming stage. Thereafter, in accordance with one of the two exemplary embodiments described above a first drive parameter, which influences the driving of the voltage transformer WR, is corrected successively by means of the closed loop explained above, until the output power or the output voltage of the operating unit corresponds adequately to its desired value in the case of the lowest dimming stage.

Subsequently, the adjusting method for the output power or output voltage is repeated for the highest dimming stage. Connected for this purpose to the terminals j1, j2 is a resistor L which represents an equivalent resistor of the lamp at the highest dimming stage (maximum brightness of the lamp). Via the external serial interface of the operating unit EVG, the external process control device P transmits to the microcontroller MC a control signal 1 which causes the operating unit EVG to set the operating state corresponding to the highest dimming stage. Thereafter, in accordance with one of the two above-described exemplary embodiments a second drive parameter which influences the driving of the voltage transformer WR is successively corrected by means of the closed loop explained above until the output power or the output voltage of the operating unit corresponds adequately to its desired value in the case of the highest dimming stage. The first and second drive parameters determine the lower and upper limiting values of the drive signal generated by the microcontroller MC for the voltage transformer WR, and thereby also fix the control range of the voltage transformer WR.

What is claimed is:

1. A method for adjusting at least one operating parameter of an operating unit for electric lamps to accommodate variation in components of the operating unit, the operating unit (EVG) having a voltage transformer (WR) with at least one load circuit (LD, C) connected thereto, a microcontroller (MC) for driving the voltage transformer (WR), and terminals (j1, j2) for at least one lamp, wherein the method has the following steps:

a) operating the operating unit (EVG) with a calibrated non-lamp load which is connected into the load circuit (LD, C) and connected to the terminals (j1, j2) in place of said lamp, b) transmitting at least one control command (1) to the operating unit (EVG), which causes the operating unit (EVG) to set a specific operating state, and which starts the adjusting method for the at least one operating parameter, c) detecting the actual value (3) of the at least one operating parameter, d) comparing the actual value (3) of the at least one operating parameter with a prescribed desired value (6) of the at least one operating parameter, e) determining and storing a correction value or desired value (5), dependent on the desired value/actual value comparison, for at least one drive parameter, which is stored in the operating unit and determines the driving of the voltage transformer (WR), f) driving the voltage transformer (WR) by using the determined correction value or desired value (5), stored in the operating unit (EVG), of the drive parameter, and g) repeating steps c) to f) if the actual value (3) of the at least one operating parameter deviates from its desired value (6) by more than a prescribed absolute value.

2. The method as claimed in claim 1, wherein the at least one operating parameter is the output voltage or output power provided at the terminals (j1, j2) of the operating unit (EVG).

3. The method as claimed in claim 1, wherein the method is carried out with the aid of an external process control device (P) which is connected to the microcontroller (MC) via an external interface of the operating unit (EVG) during the adjusting method, and generates the at least one control command (1) for the operating unit (EVG).

4. The method as claimed in claim 1, wherein the actual value (3) of the at least one operating parameter is fed to the microcontroller (MC).

5. The method as claimed in claim 4, wherein the desired value (6) of the at least one operating parameter is fed to the microcontroller (MC) or is provided by the microcontroller (MC).

6. The method as claimed in claim 5, wherein the desired value/actual value comparison is carried out by the microcontroller (MC).

7. A method for adjusting at least one operating parameter of an operating unit for electric lamps, the operating unit (EVG) having a voltage transformer (WR) with at least one load circuit (LD, C) connected thereto, a microcontroller (MC) for driving the voltage transformer (WR), and terminals (j1, j2) for at least one lamp, wherein the method has the following steps:

a) operating the operating unit (EVG) with a calibrated load which is connected into the load circuit (LD, C) and connected to the terminals (j1, j2), b) transmitting at least one control command (1) to the operating unit (EVG), which causes the operating unit (EVG) to set a specific operating state, and which starts the adjusting method for the at least one operating parameter, c) detecting the actual value (3) of the at least one operating parameter, d) comparing the actual value (3) of the at least one operating parameter with a prescribed desired value (6) of the at least one operating parameter, e) determining and storing a correction value or desired value (5), dependent on the desired value/actual value comparison, for at least one drive parameter, which is stored in the operating unit and determines the driving of the voltage transformer (WR), f) driving the voltage transformer (WR) by using the determined correction value or desired value (5), stored in the operating unit (EVG), of the drive parameter, and g) repeating steps c) to f) if the actual value (3) of the at least one operating parameter deviates from its desired value (6) by more than a prescribed absolute value;

wherein the method is carried out with the aid of an external process control device (P) which is connected to the microcontroller (MC) via an external interface of the operating unit (EVG) during the adjusting method, and generates the at least one control command (1) for the operating unit (EVG); and wherein the actual value (3) of the at least one operating parameter is fed to the external process control device (P).

8. The method as claimed in claim 7, wherein the desired value of the at least one operating parameter is provided by the external process control device (P).

9. The method as claimed in claim 8, wherein the desired value/actual value comparison is carried out by the external process control device (P).

10. A method for adjusting at least one operating parameter of an operating unit for electric lamps, the operating unit (EVG) having a voltage transformer (WR) with at least one load circuit (LD, C) connected thereto, a microcontroller (MC) for driving the voltage transformer (WR), and terminals (j1, j2) for at least one lamp, wherein the method has the following steps:

a) operating the operating unit (EVG) with a calibrated load which is connected into the load circuit (LD, C) and connected to the terminals (j1, j2), b) transmitting at least one control command (1) to the operating unit (EVG), which causes the operating unit (EVG) to set a specific operating state, and which starts the adjusting method for the at least one operating parameter, c) detecting the actual value (3) of the at least one operating parameter, d) comparing the actual value (3) of the at least one operating parameter with a prescribed desired value (6) of the at least one operating parameter, e) determining and storing a correction value or desired value (5), dependent on the desired value/actual value comparison, for at least one drive parameter, which is stored in the operating unit and determines the driving of the voltage transformer (WR), f) driving the voltage transformer (WR) by using the determined correction value or desired value (5), stored in the operating unit (EVG), of the drive parameter, and g) repeating steps c) to f) if the actual value (3) of the at least one operating parameter deviates from its desired value (6) by more than a prescribed absolute value;

wherein a first of the at least one operating parameter is output voltage or output power provided at the terminals (j1, j2) of the operating unit (EVG);

wherein the method is performed on a dimmable operating unit, the first operating parameter being the output voltage or output power of the operating unit (EVG) in the case of a minimum dimming setting, and a second of the at least one operating parameter being the output voltage or output power of the operating unit (EVG) in the case of a maximum dimming setting.

* * * * *